United States Patent
Chen et al.

(10) Patent No.: US 8,233,202 B2
(45) Date of Patent: Jul. 31, 2012

(54) SCANNER WITH SIMPLIFIED DOCUMENT FEEDING PATH

(75) Inventors: Yen-Cheng Chen, Hsinchu (TW); Ting-Kuo Chu, Hsinchu County (TW); Chia-Shih Lin, Hsinchu (TW); Chun-Chieh Liao, Hsinchu (TW)

(73) Assignee: Avision Inc. (TW)

( * ) Notice: Subject to any disclaimer, the term of this patent is extended or adjusted under 35 U.S.C. 154(b) by 601 days.

(21) Appl. No.: 12/463,362

(22) Filed: May 8, 2009

(65) Prior Publication Data

US 2009/0279149 A1    Nov. 12, 2009

(30) Foreign Application Priority Data

May 9, 2008    (TW) ................ 97117255 A

(51) Int. Cl.
 *H04N 1/04* (2006.01)
 *H04N 1/40* (2006.01)
 *H04N 1/46* (2006.01)
 *G01N 21/00* (2006.01)

(52) U.S. Cl. .......... 358/498; 358/461; 358/504; 436/164

(58) Field of Classification Search .................. 358/498, 358/474, 497, 504, 461; 250/203.2, 339.12; 436/164; 399/82
See application file for complete search history.

(56) References Cited

U.S. PATENT DOCUMENTS

| 7,858,382 B2 * | 12/2010 | Kim et al. ............. 436/164 |
| 2005/0243382 A1 * | 11/2005 | Wang ................ 358/461 |
| 2007/0154248 A1 | 7/2007 | Chen |
| 2008/0169596 A1 | 7/2008 | Wu |

FOREIGN PATENT DOCUMENTS

| TW | I276541 B | 3/2007 |
| TW | 200727676 A | 7/2007 |

OTHER PUBLICATIONS

Office Action of Counterpart Application by TW Patent Office on Oct. 13, 2011.

* cited by examiner

*Primary Examiner* — Charlotte M Baker
*Assistant Examiner* — Rury Grisham

(57) ABSTRACT

A scanner with a simplified document feeding path is provided for scanning a document. The scanner includes a paper path, a conveying mechanism, an optical module and a scan window. The conveying mechanism conveys the document along the paper path. The optical module, rotatably disposed, captures an image of the document conveyed to a first position and a second position in the paper path, wherein the optical module captures a front-side image of the document at the first position and a back-side image of the document at the second position. The scan window, mounted on the optical module, is turned toward the first position and the second position as the optical module rotates, and the optical module captures the image of the document through the scan window.

15 Claims, 4 Drawing Sheets

SCANNER WITH SIMPLIFIED DOCUMENT FEEDING PATH

This application claims the benefit of Taiwan application Serial No. 97117255, filed May 9, 2008, the subject matter of which is incorporated herein by reference.

BACKGROUND OF THE INVENTION

1. Field of the Invention

The invention relates in general to a scanner with a simplified document feeding path, and more particularly to a scanner which provides a simplified document feeding path for double-sided scanning of a document.

2. Description of the Related Art

Nowadays, scanners have played an important role in household use as well as in business use. A scanner scans a document and stores the contents of the scanned document as electronic data.

For the purpose of reducing the consumption of paper, users or publishers print or write information on both sides of a sheet of paper, and accordingly many scanners now are equipped with the function of double-sided scanning of a document to capture images of both sides in one single scanning procedure. One of the technologies to achieve double-sided scanning is to install an optical module in a scanner complemented by an intricate paper path and a complicated structure of a conveying mechanism for recirculating the document in the paper path so as to perform double-sided scanning. Another technology is to install two optical modules facing each other in the scanner. When the document is passed between the two optical modules, the two optical modules perform the scanning procedure for the document at the same time.

However, both of the technologies mentioned above have their respective drawbacks. For the first technology, a number of paper sensors may be required to sense the position of the document so that the rollers of the conveying mechanism can deliver the document with a smooth and precise motion, which results in an increase of the production cost of the scanner. Although by using the second technology the conveying mechanism may be structurally simplified, the cost of the scanner is increased as well due to the addition of a second optical module.

SUMMARY OF THE INVENTION

The invention is directed to a scanner with a simplified document feeding path. The scanner can perform double-sided scanning on a document with only one optical module, a simplified paper path and a conveying mechanism.

According to the present invention, a scanner with a simplified document feeding path is provided for scanning a document. The scanner includes a paper path, a conveying mechanism, an optical module and a scan window. The conveying mechanism conveys the document along the paper path. The optical module, rotatably disposed, captures an image of the document conveyed to a first position and a second position in the paper path, wherein the optical module captures a front-side image of the document at the first position and a back-side image of the document at the second position. The scan window, mounted on the optical module, is turned toward the first position and the second position as the optical module rotates, and the optical module captures the image of the document through the scan window.

With its structure simplified and fewer components required, the scanner of the invention can be manufactured at a lower cost and within a shorter production period.

The invention will become apparent from the following detailed description of the preferred but non-limiting embodiment. The following description is made with reference to the accompanying drawings.

DETAILED DESCRIPTION OF THE INVENTION

Figure 1:
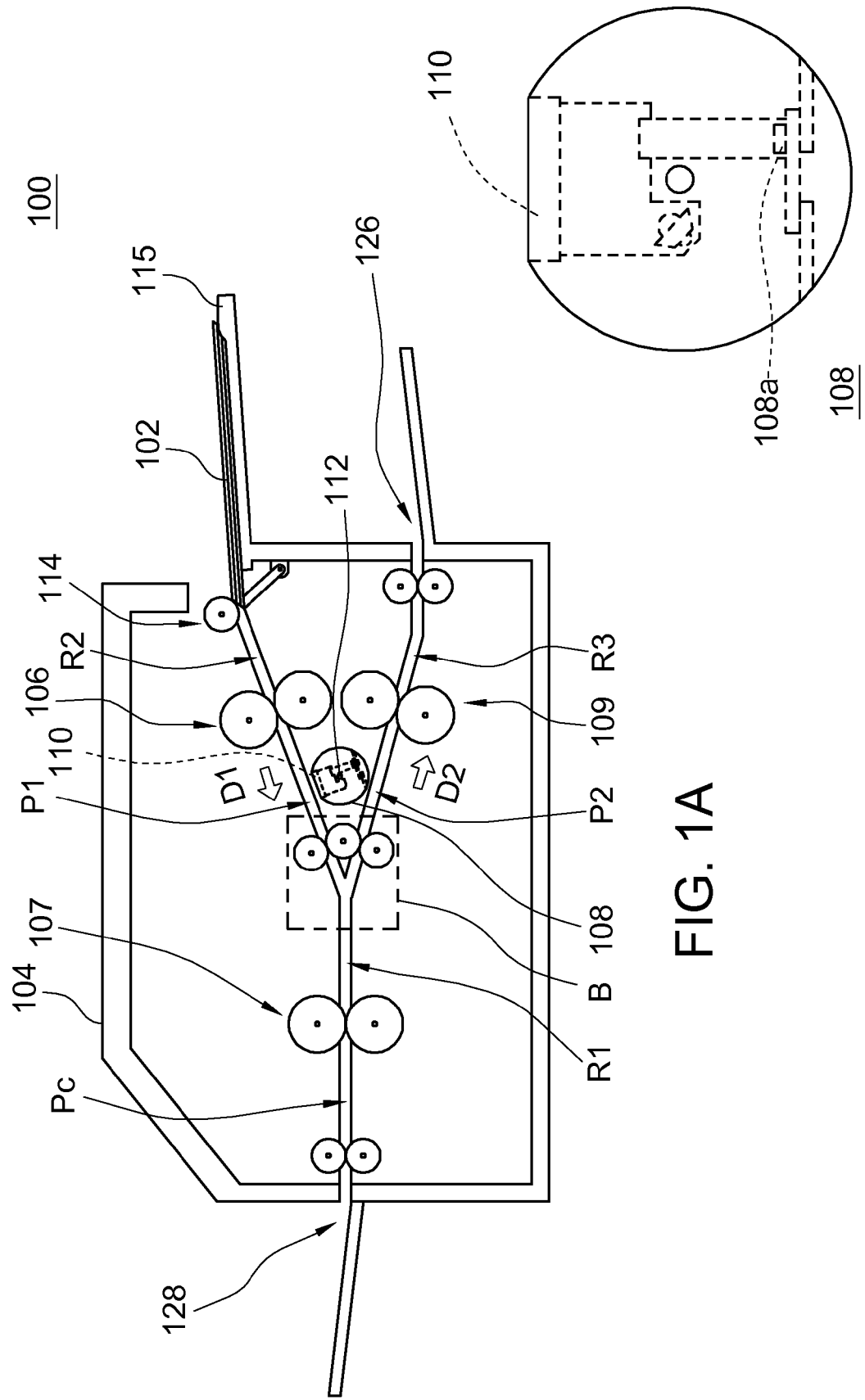
FIG. 1A shows a schematic elevational view of a scanner with a simplified document feeding path according to a preferred embodiment of the invention.
FIG. 1B shows an enlarged diagram of an optical module shown in FIG. 1A.

The invention provides a scanner with a simplified document feeding path. A preferred embodiment is disclosed below. However, the embodiment disclosed below is merely one of the several implementations under the spirit of the invention, and the disclosure and drawings of the embodiment disclosed below are for elaboration not for limiting the scope of protection of the invention.

In FIG. 1A, a schematic elevational view of a scanner with a simplified document feeding path according to a preferred embodiment of the invention is shown. The scanner 100 scans a document 102 and comprises a body 104, a paper path, a conveying mechanism, an optical module 108 and a scan window 110. The paper path comprises a first path R1, a second path R2 and a third path R3. The conveying mechanism includes a first roller set 106, a second roller set 107 and a third roller set 109 disposed in the body 104. The conveying mechanism conveys the document 102 along the paper path. A first position P1 is located in the second path R2 and a second position is located in the third path R3. To complete the double-sided scanning procedure, the conveying mechanism conveys the document 102 to pass the first position P1 and then the second position P2. The first roller set 106 and the second roller set 107 convey the document 102 in a first direction D1 to pass the first position P1. After the document 102 passed the first position P1, the second roller set 107 and the third roller set 109 convey the document 102 in a second direction D2 to pass the second position P2.

The optical module 108, rotatably disposed in the body 104, captures an image of the document 102. The optical module 108 is disposed so that the first position P1 is located at a side of the optical module 108 and the second position P2 is located at another side of the optical module 108. The scan window 110 is mounted on the optical module 108 and extends longitudinally along the length of the optical module 108. The optical module 108 captures the image of the document 102 through the scan window 110. As the optical module 108 rotates clockwise or counterclockwise, the scan window is turned toward the first position P1 or the second position P2. The optical module 108 includes an image sensor 108a such as a charge-coupled device (CCD) or a contact image sensor (CIS) as indicated in FIG. 1B. Referring to FIG. 1A again, the optical module 108, preferably being cylindrical, is mounted on and rotated around a rotary shaft 112. The rotary shaft 112 is positioned transverse to the second path R2 and the third path R3. When the conveying mechanism conveys the document 102 to the first position P1, the scan window 110 on the optical module 108 is turned toward the first position P1 for the optical module 108 to capture a front-side image of the document 102. When the conveying mechanism conveys the document 102 to the second position P2, the scan window 110 on the optical module 108 is turned toward the second position P2 for the optical module 108 to capture a back-side image of the document 102. That is, when the scanner 100 performs double-sided scanning on the document 102, the optical module 108 is rotated around the rotary shaft 112 to capture the front-side image and the back-side image of the document 102 respectively.

In addition to double-sided scanning, the scanner 100 can also perform single-sided scanning. When the scanner 100 performs single-sided scanning on the document 102, the optical module 108 does not rotate when the document 102 reaches the second position P2. That is, the optical module 108 does not capture the back-side image of the document 102. In another way, the optical module 108 rotates, but does not capture the back-side image of the document 102. That is, when the document 102 is conveyed to the second position P2, the optical module 108 determines whether to capture the back-side image of the document 102 according to whether single-sided scanning or double-sided scanning is requested.

Preferably, the scanner 100 has an automatic document feeder (ADF) 114 for feeding the document 102 into the paper path of the scanner 100. When the document 102 is placed on a tray 115 of the ADF 114, the ADF 114 feeds the document 102 to the first roller set 106 when the scan function of the scanner 100 is activated.

As indicated in FIG. 1A, the paper path comprises the first path R1, the second path R2 and the third path R3, and one end of the first path R1 is joined with an end of the second path R2 and an end of the third path R3. Preferably, the first position P1 is located in the second path R2, and the second position P2 is located in the third path R3. And there is a relay position Pc located in the first path R1, and the conveying mechanism may convey the document 102 to pass the relay position Pc. When the double-sided scanning is performed, the conveying mechanism conveys the document 102 along the paper path, in the order of the second path R2, the first path R1 and the third path R3. The document 102 is delivered to the first position P1 in the second path R2, the relay position Pc in the first path R1, and then the second position P2 in the third path R3.

The body 104 further has a paper exit 126 positioned at the other end of the third path R3, that is, the end not at the junction of the first path R1, the second path R2 and the third path R3. The conveying mechanism conveys the document 102 to the paper exit 126 in the third path R3 to eject the document 102 out of the scanner 100 after the scanner 100 finishes single-sided scanning or double-sided scanning on the document 102. The user of the scanner 100 can retrieve the scanned document 102 from the paper exit 126.

In addition to the paper exit 126 at the third path R3, another paper exit 128 can be disposed at the other end of the first path R1, that is, the end not at the junction of the first path R1, the second path R2 and the third path R3. When the scanner 100 performs single-sided scanning on the document 102, the conveying mechanism conveys the document 102 to pass the first position P1 and then the relay position Pc. Instead of conveying the document 102 to the second position P2, the conveying mechanism can optionally eject the document 102 out of the scanner 100 at the paper exit 128. Thus, the arrangement of the paper exits 126 and 128 provides alternative paths of the paper ejection for the single-sided scanning.

Figure 2:
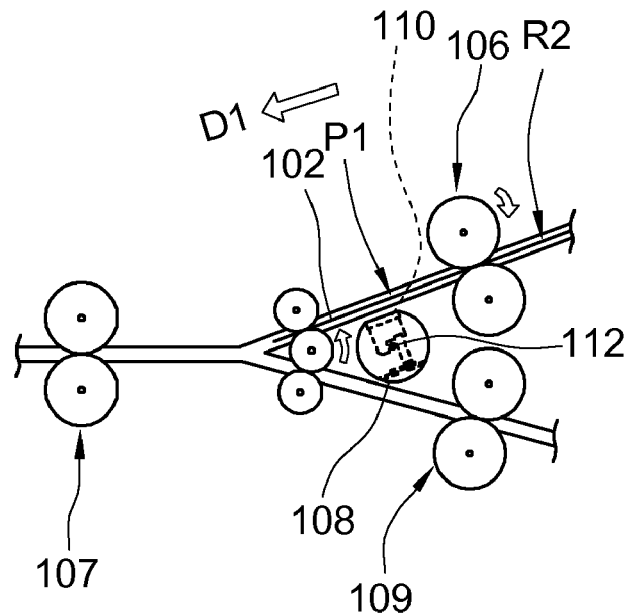
FIG. 2 shows a schematic elevational view of a conveying mechanism of FIG. 1A conveying the document to pass a first position.
Figure 3:
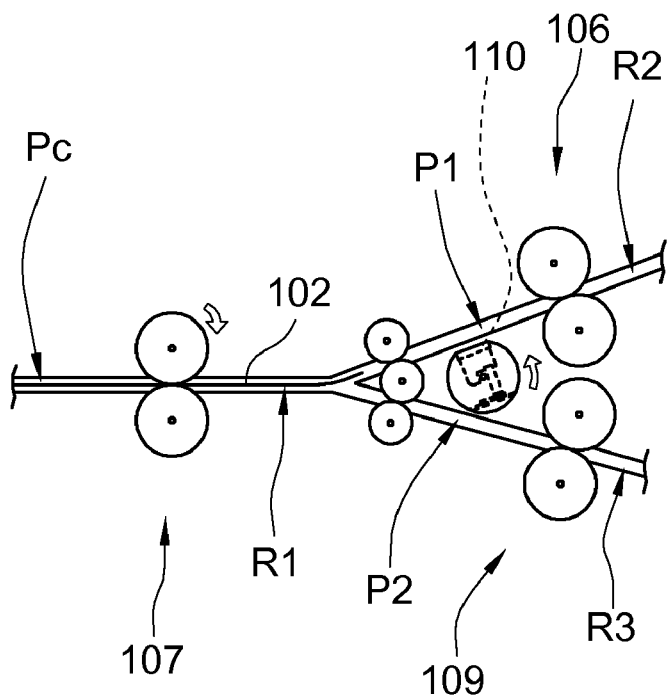
FIG. 3 shows a schematic elevational view of the conveying mechanism of FIG. 1A conveying the document to pass a relay position.
Figure 4:
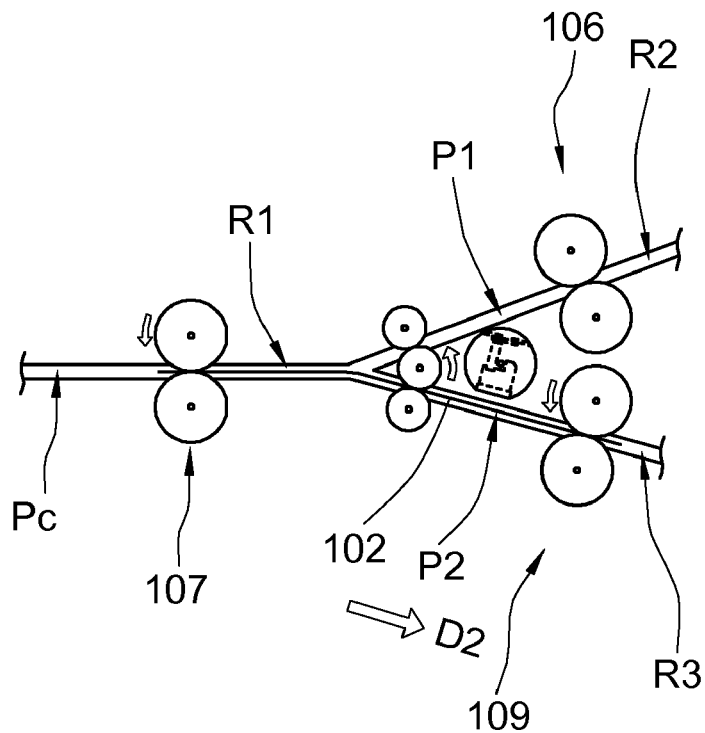
FIG. 4 shows a schematic elevational view of the conveying mechanism of FIG. 1A conveying the document to pass a second position.

In FIGS. 2, 3 and 4, diagrams of the conveying mechanism of FIG. 1A conveying the document 102 to pass the first position P1, the relay position Pc and the second position P2 respectively are shown. The conveying mechanism conveys the document 102 to enter the second path R2. After the document 102 passes the first position P1 and arrives at the relay position Pc in the first path R1, the conveying mechanism conveys the document 102 in another direction to the second position P2 in the third path R3. The followings are detailed descriptions of the actions of the scanner 100 when the document 102 passes the first position P1, the relay position Pc and the second position P2.

As indicated in FIG. 2, the first roller set 106 conveys the document 102 to pass the first position P1 in the first direction D1. When the document 102 is delivered to the first position P1, the optical module 108 is rotated to turn the scan window 110 toward the first position P1 and the document 102 for the optical module 108 to capture the front-side image of the document 102.

As indicated in FIG. 3, after the optical module 108 finishes capturing the front-side image of the document 102, the document 102 is subsequently conveyed to the relay position Pc.

As indicated in FIG. 4, when the document 102 is at the relay position Pc, the second roller set 107 conveys the document 102 in the second direction D2 to pass the second position P2. As the document 102 reaches the second position P2, the optical module 108 is rotated to turn the scan window 110 toward the second position P2 and the document 102 for the optical module 108 to capture the back-side image of the document 102. As illustrated in FIG. 1, the first direction D1 may be reverse to the second direction D2. Thus, when the document 102 is conveyed to the second position P2 from the relay position Pc, the other side of the document 102, that is, the back side of the document 102, faces the scan window 110 of the optical module 108. As a result, the optical module 108 is able to capture the back-side image of the document 102 to accomplish double-sided scanning. In the descriptions above, the optical module 108 is rotated 90 degrees to 180 degrees to turn the scan window 110 from the first position P1 toward the second position P2.

As illustrated in FIG. 4, one end of the first path R1 is joined with an end of the second path R2 and an end of the third path R3, and the junction of the first path R1, the second path R2 and the third path R3 forms a Y-shaped paper path, which, in comparison with paper paths of the first technology of prior art mentioned above, is reduced in size and simplified in structure. With the simplified paper path disclosed above, double-sided scanning can be achieved by using only one optical module.

Figure 5:
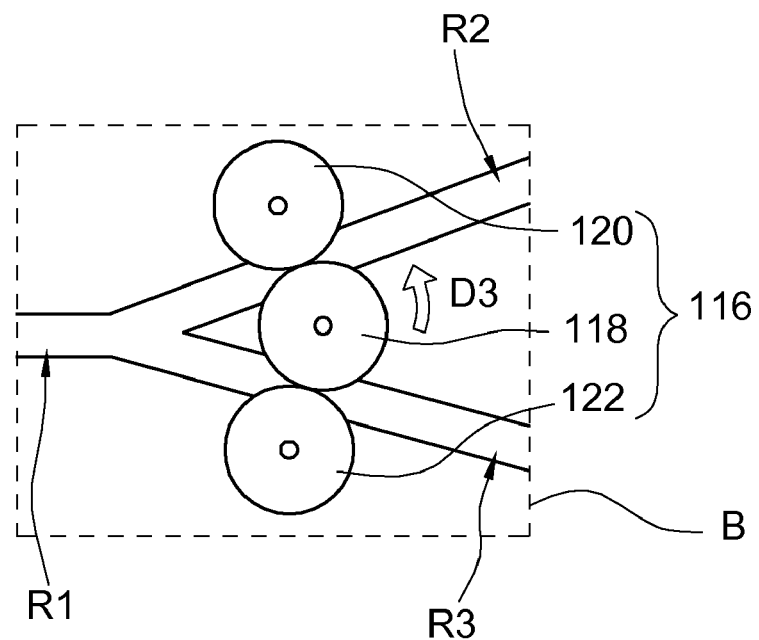
FIG. 5 shows a partial enlargement of a region B of FIG. 1A, with an implementation of a guiding mechanism.

Moreover, the scanner 100 further includes a guiding mechanism 116 disposed at the junction of the first path R1, the second path R2 and the third path R3. The guiding mechanism 116 directs the document 102 to the first path R1 from the second path R2 and directs the document 102 to the third path R3 from the first path R1. In FIG. 5, a partial enlargement of a region B of FIG. 1A which depicts the guiding mechanism 116 is shown. The guiding mechanism 116 includes a driven roller 118, a first idle roller 120 and a second idle roller 122. The first idle roller 120 is positioned at a side of the driven roller 118 and the second idle roller 122 is positioned at another side of the driven roller 118. The driven roller 118 drives the first idle roller 120 and the second idle roller 122. The driven roller 118 and the first idle roller 120 convey the document 102 from the second path R2 to the first path R1. The driven roller 118 and the second idle roller 122 convey the document 102 from the first path R1 to the third path R3.

That is, during the process of conveying the document 102 to the first path R1 from the second path R2 by the first roller set 106 (illustrated in FIG. 1A), the driven roller 118 rotates in a direction D3, in this embodiment, counterclockwise, and the document 102 is directed to the first path R1 as the document 102 contacts the driven roller 118 and the first idle roller 120. During the process of conveying the document 102 to the third path R3 from the relay position Pc in the first path R1 by the second roller set 107 (illustrated in FIG. 1A), the document 102 is directed to the third path R3 as the document 102 contacts the driven roller 118 and the second idle roller 122. When the document 102 is entering the second path R2 from the first path R1, the driven roller 118 and the second idle roller 122 direct the document 102 to enter the third path R3 as the document 102 contacts the driven roller 118 and the second idle roller 122, and thus the document 102 will not enter the second path R2 erroneously.

Figure 6A:
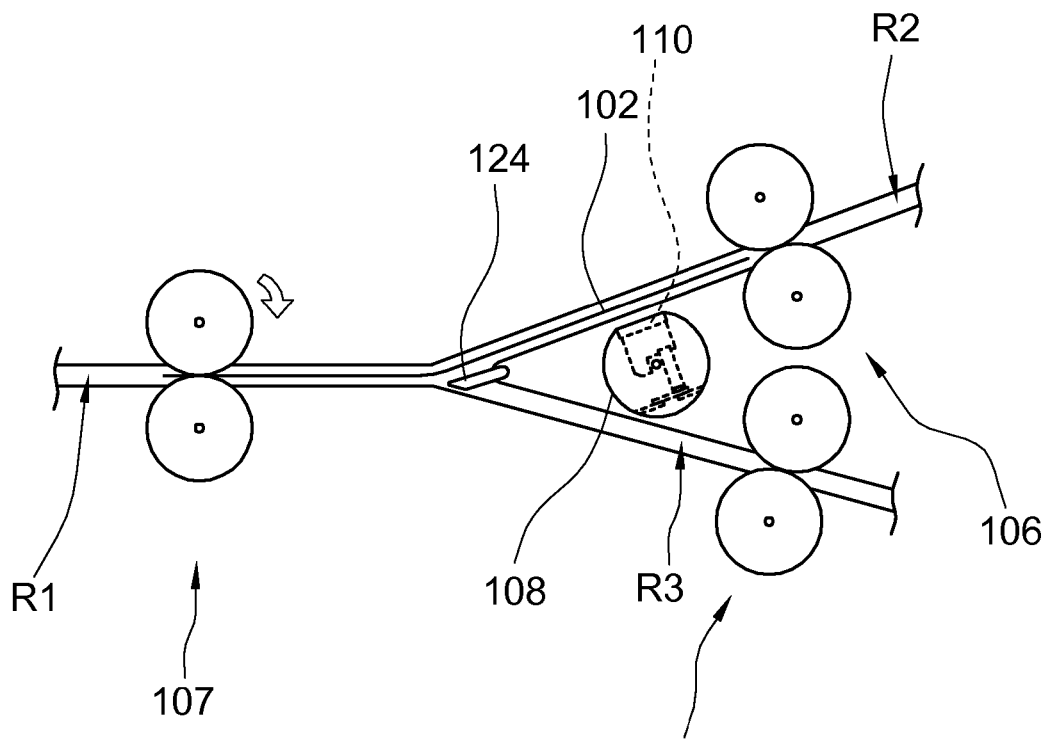
FIG. 6A shows another implementation of the guiding mechanism of the scanner of the present embodiment of the invention, directing the document from a second path to a first path.
Figure 6B:
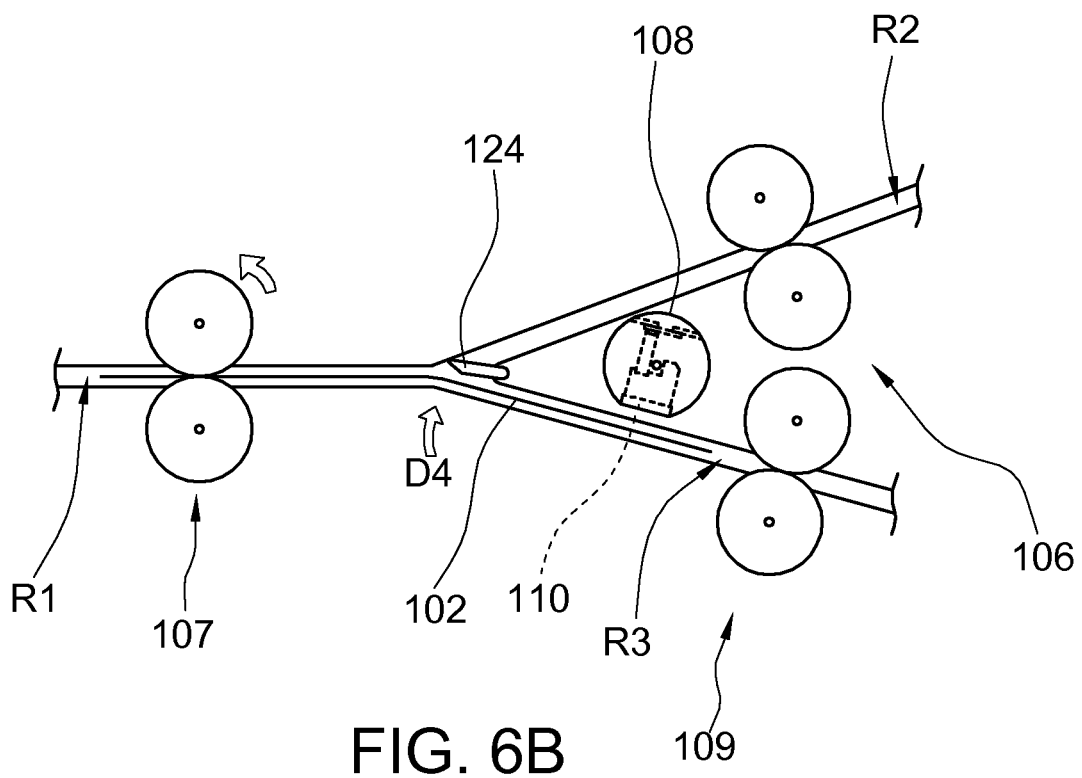
FIG. 6B shows the guiding mechanism of FIG. 6A directing the document from the first path to a third path.

In FIG. 6A, another implementation of the guiding mechanism of the scanner of the present embodiment of the invention is shown. The guiding mechanism can be a guide rod 124 which is pivotally disposed and switchable in directions. The guide rod 124 is pivotally disposed at the junction of the first path R1, the second path R2 and the third path R3, and directs the document 102 in the second path R2 to enter the first path R1 and directs the document 102 in the first path R1 to enter the third path R3.

That is, when the document 102 is conveyed to the first path R1 from the first position P1 in the second path R2, the guide rod 124, whose position is indicated in FIG. 6A, blocks an entrance of the third path R3 so as to direct the document 102 to enter the first path R1. When the document 102 is conveyed to the third path R3 from the relay position Pc in the first path R1, the guide rod 124 is rotated in a direction D4 to block an entrance of the second path R2. Thus, the document 102 is directed to enter the third path R3.

According to the embodiment of the invention, only one rotatable optical module and a simplified paper path would suffice to achieve double-sided scanning. The scanner of the invention has a simplified structure and fewer components, and therefore, the cost of the design and the manufacturing of the scanner can be reduced. Compared with the conventional scanners capable of double-sided scanning which have complicated paper paths and require two optical modules, the scanner of the invention can be manufactured at a lower cost and sold at a lower price, and be very competitive in the market.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A scanner with a simplified document feeding path, comprising:
    a paper path;
    a conveying mechanism for conveying a document along the paper path;
    an optical module, rotatably disposed, for capturing an image of the document conveyed to a first position and a second position in the paper path, wherein the optical module captures a front-side image of the document at the first position and a back-side image of the document at the second position; and
    a scan window, mounted on the optical module, wherein through the scan window the optical module captures the image of the document, and the scan window is turned toward the first position and the second position as the optical module rotates,
    wherein the paper path comprises a first path, a second path and a third path, and the first position is located in the second path, and the second position is located in the third path.

2. The scanner according to claim 1, wherein the optical module is cylindrical and the optical module is mounted on and rotated around a rotary shaft positioned transverse to the paper path.

3. The scanner according to claim 2, wherein the optical module is rotated 90 to 180 degrees to turn the scan window from the first position toward the second position.

4. The scanner according to claim 1, wherein the first position is located at a side of the optical module and the second position is located at another side of the optical module, and the conveying mechanism comprises a plurality of roller sets for conveying the document in a first direction to pass the first position, and for conveying the document in a second direction to pass the second position.

5. The scanner according to claim 4, wherein the second direction is reverse to the first direction.

6. The scanner according to claim 1, wherein the optical module comprises a contact image sensor.

7. The scanner according to claim 6, wherein one end of the first path is joined with an end of the second path and an end of the third path.

8. The scanner according to claim 7, wherein the conveying mechanism conveys the document to pass the first position in the second path and then a relay position in the first path, and finally the conveying mechanism conveys the document in a reverse direction to pass the second position in the third path.

9. The scanner according to claim 8, wherein the document is ejected out of the scanner at a paper exit in the third path.

10. The scanner according to claim 7, further comprising:
    a guiding mechanism disposed at the junction of the first path, the second path and the third path, wherein the guiding mechanism directs the document from the second path to the first path and directs the document from the first path to the third path.

11. The scanner according to claim 10, wherein the guiding mechanism is a guide rod, pivotally disposed and switchable in directions.

12. The scanner according to claim 10, wherein the guiding mechanism comprises a driven roller, a first idle roller and a second idle roller, wherein the first idle roller is positioned at a side of the driven roller and the second idle roller is positioned at another side of the driven roller, the driven roller drives the first idle roller and the second idle roller, the driven roller and the first idle roller convey the document from the second path to the first path, and the driven roller and the second idle roller convey the document from the first path to the third path.

13. The scanner according to claim 7, wherein the conveying mechanism conveys the document to pass the first position in the second path and then a relay position in the first path.

14. The scanner according to claim 13, wherein the document is ejected out of the scanner at a paper exit in the first path.

15. The scanner according to claim 1, wherein the optical module comprises a charge-coupled device.

* * * * *